(12) United States Patent
Khan et al.

(10) Patent No.: US 12,386,956 B1
(45) Date of Patent: Aug. 12, 2025

(54) AUTOMATIC DISCOVERY AND ENTERPRISE CONTROL OF A ROBOTIC WORKFORCE

(71) Applicant: NTT DATA Services, LLC, Plano, TX (US)

(72) Inventors: Tanvir Khan, Allen, TX (US); Harsh Vinayak, Gurgaon (IN); Dhurai Ganesan, Chennai (IN); Sankar Chandrasekaran, Chennai (IN); Gowrishanker Pari, Chennai (IN); Ujjwal Sharma, Chennai (IN)

(73) Assignee: NTT DATA Services, LLC, Plano, TX (US)

( * ) Notice: Subject to any disclaimer, the term of this patent is extended or adjusted under 35 U.S.C. 154(b) by 193 days.

(21) Appl. No.: 17/973,233

(22) Filed: Oct. 25, 2022

Related U.S. Application Data

(60) Provisional application No. 63/272,028, filed on Oct. 26, 2021.

(51) Int. Cl.
  *G06F 21/56* (2013.01)
  *G06F 21/55* (2013.01)

(52) U.S. Cl.
  CPC .......... *G06F 21/56* (2013.01); *G06F 21/554* (2013.01); *G06F 2221/033* (2013.01)

(58) Field of Classification Search
  CPC ... G06F 21/56; G06F 21/554; G06F 2221/033
  See application file for complete search history.

(56) References Cited

U.S. PATENT DOCUMENTS

| | | | | |
|---|---|---|---|---|
| 5,951,698 A * | 9/1999 | Chen | ............. | G06F 21/563 714/38.1 |
| 7,546,601 B2 | 6/2009 | Byrd et al. | | |
| 7,870,610 B1 * | 1/2011 | Mitchell | ............. | G06F 21/53 726/25 |
| 8,056,132 B1 * | 11/2011 | Chang | ............. | G06F 21/552 726/28 |
| 8,418,249 B1 * | 4/2013 | Nucci | ............. | G06F 21/552 709/225 |
| 8,490,190 B1 * | 7/2013 | Hernacki | ............. | H04L 63/1425 726/28 |
| 8,510,795 B1 * | 8/2013 | Gargi | ............. | G09B 5/06 713/180 |
| 8,555,388 B1 * | 10/2013 | Wang | ............. | H04L 69/22 713/188 |

(Continued)

FOREIGN PATENT DOCUMENTS

CN        111597012 A     8/2020

OTHER PUBLICATIONS

Argos Labs website front page from Oct. 6, 2022 containing Argos POT SDK link (Year: 2022).*

*Primary Examiner* — Aravind K Moorthy
(74) *Attorney, Agent, or Firm* — Patterson + Sheridan, LLP

(57) ABSTRACT

In an embodiment, a method includes receiving bot presence data from a bot discovery agent executing in a computing environment. The method also includes determining, based on the bot presence data, whether an unauthorized bot is present in the computing environment. The method also includes, responsive to a determination, based on the bot presence data, that an unauthorized bot is present in the computing environment, automatically initiating a remediation workflow relative to the unauthorized bot.

20 Claims, 6 Drawing Sheets

(56) References Cited

U.S. PATENT DOCUMENTS

| | | | |
|---|---|---|---|
| 8,739,272 B1* | 5/2014 | Cooper | H04L 63/20 726/13 |
| 8,838,570 B1* | 9/2014 | English | H04L 63/1408 707/709 |
| 8,997,226 B1* | 3/2015 | Call | H04L 63/1483 709/224 |
| 9,178,903 B1* | 11/2015 | Kaplan | H04L 63/1433 |
| 9,294,502 B1* | 3/2016 | Benishti | H04L 63/145 |
| 9,430,646 B1* | 8/2016 | Mushtaq | H04L 67/02 |
| 9,584,367 B2 | 2/2017 | Zizlavsky et al. | |
| 9,602,538 B1* | 3/2017 | Chou | H04L 63/20 |
| 9,635,039 B1* | 4/2017 | Islam | H04L 63/145 |
| 9,762,596 B2 | 9/2017 | Wang et al. | |
| 10,200,384 B1 | 2/2019 | Mushtag et al. | |
| 10,270,792 B1* | 4/2019 | Shemesh | H04L 63/1433 |
| 10,454,774 B2 | 10/2019 | Smith et al. | |
| 10,516,695 B1* | 12/2019 | Evans | H04L 63/1425 |
| 10,587,636 B1* | 3/2020 | Aziz | H04L 63/145 |
| 10,600,335 B1* | 3/2020 | Donovan | G09B 7/04 |
| 10,630,556 B2 | 4/2020 | Langston et al. | |
| 10,652,270 B1 | 5/2020 | Hu et al. | |
| 10,762,090 B2 | 9/2020 | Hanusiak et al. | |
| 10,802,889 B1* | 10/2020 | Ganesan | G06F 9/5005 |
| 10,911,483 B1* | 2/2021 | Wasiq | H04L 63/10 |
| 10,958,689 B1* | 3/2021 | Ganesan | G06N 20/00 |
| 11,233,823 B1* | 1/2022 | Venkataramani | H04L 63/1491 |
| 11,240,200 B1* | 2/2022 | Vasquez | H04L 9/006 |
| 11,301,224 B1* | 4/2022 | Dabhi | G06F 9/4881 |
| 11,409,909 B1* | 8/2022 | Alderton | G06F 16/953 |
| 11,436,526 B1* | 9/2022 | Ganesan | H04L 63/1441 |
| 11,445,003 B1* | 9/2022 | Katta | H04L 63/0236 |
| 11,726,902 B1* | 8/2023 | Ganesan | G06F 11/0772 717/124 |
| 11,803,355 B2* | 10/2023 | Chinnasamy | G06F 8/00 |
| 11,850,750 B1* | 12/2023 | Ganesan | G06N 5/025 |
| 12,034,740 B1* | 7/2024 | Carmack | H04L 63/1416 |
| 12,063,251 B1* | 8/2024 | Breger | H04L 69/22 |
| 12,093,147 B1* | 9/2024 | Christmas | G06F 16/215 |
| 12,099,357 B1* | 9/2024 | Ebrahimi Afrouzi | G05D 1/0214 |
| 2004/0088564 A1* | 5/2004 | Norman | G06F 21/566 713/188 |
| 2005/0138132 A1* | 6/2005 | Zhou | H04L 51/04 709/207 |
| 2007/0097976 A1* | 5/2007 | Wood | H04L 63/1416 370/392 |
| 2008/0028467 A1* | 1/2008 | Kommareddy | H04L 63/1458 726/23 |
| 2008/0120413 A1* | 5/2008 | Mody | G06Q 10/107 709/226 |
| 2008/0209223 A1* | 8/2008 | Nandy | G06F 21/36 713/185 |
| 2008/0256619 A1* | 10/2008 | Neystadt | H04L 63/10 726/5 |
| 2008/0295175 A1* | 11/2008 | Ansari | H04L 63/1416 726/23 |
| 2008/0307526 A1* | 12/2008 | Chung | H04L 63/1416 726/23 |
| 2009/0044264 A1* | 2/2009 | Ramanathan | H04L 63/08 713/186 |
| 2010/0199338 A1* | 8/2010 | Craddock | G06F 21/31 726/7 |
| 2010/0325706 A1* | 12/2010 | Hachey | G06F 21/36 713/170 |
| 2011/0055921 A1* | 3/2011 | Narayanaswamy | H04L 63/1458 726/22 |
| 2011/0126136 A1* | 5/2011 | Abella | H04L 63/1408 715/764 |
| 2011/0154489 A1* | 6/2011 | Jeong | H04L 63/1416 726/22 |
| 2011/0320822 A1* | 12/2011 | Lind | G06F 21/316 713/182 |
| 2012/0030731 A1* | 2/2012 | Bhargava | H04L 63/10 726/3 |
| 2012/0030761 A1* | 2/2012 | Baba | H04L 63/1416 726/23 |
| 2012/0054869 A1* | 3/2012 | Yen | H04L 63/1441 709/245 |
| 2012/0124667 A1* | 5/2012 | Chiang | G06F 21/566 726/24 |
| 2012/0167210 A1* | 6/2012 | Oro Garcia | H04L 63/101 726/22 |
| 2012/0233694 A1* | 9/2012 | Baliga | H04W 12/12 726/23 |
| 2012/0304288 A1* | 11/2012 | Wright | H04L 63/1425 726/22 |
| 2012/0317641 A1* | 12/2012 | Coskun | H04L 63/1425 726/22 |
| 2013/0007870 A1* | 1/2013 | Devarajan | H04L 63/1416 726/11 |
| 2013/0174256 A1* | 7/2013 | Powers | H04L 63/145 726/23 |
| 2013/0291107 A1* | 10/2013 | Marck | G06F 21/316 726/22 |
| 2014/0013434 A1* | 1/2014 | Ranum | G06F 21/564 726/24 |
| 2014/0283067 A1* | 9/2014 | Call | H04L 63/1425 726/23 |
| 2014/0337972 A1* | 11/2014 | Foster | H04L 63/1441 726/22 |
| 2015/0264068 A1* | 9/2015 | Beauchesne | H04L 63/1416 726/23 |
| 2016/0080395 A1* | 3/2016 | Reddy | H04L 61/5007 726/23 |
| 2016/0182537 A1* | 6/2016 | Tatourian | H04L 63/145 726/23 |
| 2016/0344765 A1* | 11/2016 | Shiell | H04L 63/1458 |
| 2016/0344769 A1* | 11/2016 | Li | H04L 63/168 |
| 2016/0359904 A1* | 12/2016 | Ben Ezra | H04L 63/1458 |
| 2017/0070534 A1* | 3/2017 | Bailey | G06F 21/32 |
| 2017/0076089 A1* | 3/2017 | Turgeman | G06F 3/04812 |
| 2017/0180312 A1* | 6/2017 | Sullivan | H04L 61/3025 |
| 2017/0201543 A1* | 7/2017 | Terry | H04L 63/1425 |
| 2017/0257385 A1* | 9/2017 | Overson | H04L 67/565 |
| 2017/0310687 A1* | 10/2017 | Sun | H04L 63/1425 |
| 2017/0337377 A1* | 11/2017 | Vlaznev | G06F 9/45558 |
| 2017/0359360 A1* | 12/2017 | Zavdi | H04L 63/1433 |
| 2018/0020355 A1* | 1/2018 | Targali | H04W 12/128 |
| 2018/0054458 A1* | 2/2018 | Marck | H04L 63/1458 |
| 2018/0101533 A1* | 4/2018 | Robichaud | G06F 16/9535 |
| 2018/0239902 A1* | 8/2018 | Godard | G06F 21/53 |
| 2018/0324219 A1* | 11/2018 | Xie | H04L 63/0209 |
| 2018/0336326 A1* | 11/2018 | Wallace | G06F 21/577 |
| 2018/0345489 A1* | 12/2018 | Allen, IV | G05B 19/0421 |
| 2018/0349207 A1* | 12/2018 | Erickson | H04L 9/3239 |
| 2019/0018657 A1* | 1/2019 | Landowski | G06F 8/60 |
| 2019/0098051 A1* | 3/2019 | Carothers | G06F 9/45558 |
| 2019/0116103 A1* | 4/2019 | Ravid | H04L 43/08 |
| 2019/0155225 A1* | 5/2019 | Kothandaraman | G06N 3/006 |
| 2019/0171513 A1* | 6/2019 | Purushothaman | H04L 41/16 |
| 2019/0190931 A1* | 6/2019 | Levin | H04L 63/20 |
| 2019/0303232 A1* | 10/2019 | Antonio | G06F 11/302 |
| 2019/0332747 A1* | 10/2019 | Raman | G06F 21/55 |
| 2019/0334905 A1* | 10/2019 | Lelcuk | H04L 9/3239 |
| 2020/0028874 A1* | 1/2020 | Lam | H04L 63/145 |
| 2020/0045073 A1* | 2/2020 | Ekambaram | G06F 21/577 |
| 2020/0059452 A1* | 2/2020 | Ravichandran | H04W 12/122 |
| 2020/0065685 A1* | 2/2020 | Chenny | G06F 16/283 |
| 2020/0067923 A1* | 2/2020 | Dasari | H04L 63/104 |
| 2020/0067970 A1* | 2/2020 | Compton | H04L 45/32 |
| 2020/0169554 A1* | 5/2020 | Trim | H04W 4/12 |
| 2020/0193009 A1* | 6/2020 | Shafet | G06F 16/332 |
| 2020/0201992 A1* | 6/2020 | Hadar | G06F 21/56 |
| 2020/0274902 A1* | 8/2020 | Gopal | H04L 63/0209 |
| 2020/0310844 A1* | 10/2020 | Dennis | H04L 63/083 |
| 2020/0314655 A1* | 10/2020 | Jain | H04L 63/0236 |
| 2020/0334095 A1* | 10/2020 | Xu | G06F 11/076 |
| 2020/0348960 A1* | 11/2020 | Krishnamurthy | G06F 9/45529 |
| 2020/0366689 A1* | 11/2020 | Lotia | H04L 63/1483 |
| 2020/0387358 A1* | 12/2020 | Chae | G06F 9/44589 |

(56) References Cited

U.S. PATENT DOCUMENTS

| | | | |
|---|---|---|---|
| 2021/0029129 A1* | 1/2021 | Gupta | H04L 63/08 |
| 2021/0037047 A1* | 2/2021 | O'Hara | H04L 63/1458 |
| 2021/0067550 A1* | 3/2021 | Paine | H04L 63/1491 |
| 2021/0067553 A1* | 3/2021 | Ries | H04L 63/0263 |
| 2021/0112091 A1* | 4/2021 | Compton | H04L 63/1416 |
| 2021/0126940 A1* | 4/2021 | O'Hara | H04L 63/126 |
| 2021/0129325 A1* | 5/2021 | Yu | G05B 19/4155 |
| 2021/0133317 A1* | 5/2021 | Pham | G06F 16/51 |
| 2021/0141893 A1* | 5/2021 | Soman | G06F 21/563 |
| 2021/0160283 A1* | 5/2021 | St. Pierre | H04L 63/1491 |
| 2021/0173930 A1* | 6/2021 | Dahal | H04L 63/145 |
| 2021/0194969 A1* | 6/2021 | Syed | H04L 67/535 |
| 2021/0200589 A1* | 7/2021 | Jain | G06F 9/505 |
| 2021/0200859 A1* | 7/2021 | Yavo | G06F 21/56 |
| 2021/0200870 A1* | 7/2021 | Yavo | H04L 63/1416 |
| 2021/0203521 A1* | 7/2021 | Konda | H04L 67/025 |
| 2021/0241241 A1* | 8/2021 | Lokanath | G06Q 20/065 |
| 2021/0243205 A1* | 8/2021 | Peron | H04L 63/1408 |
| 2021/0266292 A1* | 8/2021 | Tirumala | H04L 63/0236 |
| 2021/0281605 A1* | 9/2021 | Thangellapalli | H04L 63/1491 |
| 2021/0334342 A1* | 10/2021 | Hernvall | H04L 9/50 |
| 2021/0344708 A1* | 11/2021 | Nicusor-Sorin | H04L 63/1466 |
| 2021/0374241 A1* | 12/2021 | Parikh | G06F 21/53 |
| 2021/0392147 A1* | 12/2021 | Ma | H04L 63/1416 |
| 2021/0397462 A1* | 12/2021 | Chenguttuvan | G06N 20/00 |
| 2021/0400057 A1* | 12/2021 | Devane | H04L 63/1425 |
| 2021/0400065 A1* | 12/2021 | Herley | H04L 63/1441 |
| 2022/0004937 A1* | 1/2022 | Elkin | G06F 9/445 |
| 2022/0019688 A1* | 1/2022 | Nelluri | G06F 21/6245 |
| 2022/0021686 A1* | 1/2022 | Singh | H04L 63/20 |
| 2022/0032457 A1* | 2/2022 | Anand | G06V 40/20 |
| 2022/0036488 A1* | 2/2022 | Brutsche | G06N 20/00 |
| 2022/0092058 A1* | 3/2022 | Vijayan | H04L 67/10 |
| 2022/0116481 A1* | 4/2022 | Katta | H04L 67/02 |
| 2022/0121982 A1* | 4/2022 | Rajagopalan | G06F 9/5011 |
| 2022/0131895 A1* | 4/2022 | Ho | G06Q 30/0222 |
| 2022/0138604 A1* | 5/2022 | Mehra | G06F 8/10 706/46 |
| 2022/0164200 A1* | 5/2022 | Ganhotra | G06F 40/216 |
| 2022/0164697 A1* | 5/2022 | Subramaniam | G06N 5/01 |
| 2022/0197674 A1* | 6/2022 | Ginoya | G09G 5/14 |
| 2022/0200978 A1* | 6/2022 | Ho | H04L 63/12 |
| 2022/0231865 A1* | 7/2022 | Bedi | H04L 9/0825 |
| 2022/0263861 A1* | 8/2022 | Marozas | G06F 21/552 |
| 2022/0278947 A1* | 9/2022 | Cameron | G09B 5/06 |
| 2022/0284106 A1* | 9/2022 | Stolfo | H04L 67/131 |
| 2022/0300336 A1* | 9/2022 | Major | G06F 9/546 |
| 2022/0329624 A1* | 10/2022 | Katta | G06F 21/128 |
| 2022/0374105 A1* | 11/2022 | Seth | G06F 3/04842 |
| 2022/0385676 A1* | 12/2022 | Chen Kaidi | G06F 21/554 |
| 2022/0391310 A1* | 12/2022 | Ghergu | G06F 11/3688 |
| 2022/0394058 A1* | 12/2022 | Meunier | H04L 63/1441 |
| 2022/0400071 A1* | 12/2022 | Walters | H04L 43/06 |
| 2022/0407886 A1* | 12/2022 | dos Santos Silva | G10L 15/22 |
| 2022/0417266 A1* | 12/2022 | Muthiah | H04L 63/1441 |
| 2023/0032814 A1* | 2/2023 | Pandurangan | H04L 63/108 |
| 2023/0050174 A1* | 2/2023 | Cassero | B25J 9/163 |
| 2023/0056439 A1* | 2/2023 | Dimble | G06F 21/602 |
| 2023/0091851 A1* | 3/2023 | Tamir | H04L 9/006 713/159 |
| 2023/0105021 A1* | 4/2023 | Shah | H04L 41/145 726/11 |
| 2023/0110941 A1* | 4/2023 | Makhija | G06F 40/284 709/224 |

* cited by examiner

AUTOMATIC DISCOVERY AND ENTERPRISE CONTROL OF A ROBOTIC WORKFORCE

CROSS-REFERENCE TO RELATED APPLICATIONS

This patent application claims priority to U.S. Provisional Application No. 63/272,028 filed on Oct. 26, 2021. U.S. Provisional Application No. 63/272,028 filed on Oct. 26, 2021 is hereby incorporated by reference.

BACKGROUND

Technical Field

The present disclosure relates generally to robotic processes and more particularly, but not by way of limitation, to automatic enterprise control of unauthorized robotic workforce.

History of Related Art

Task automation, while often desirable, is often performed in an uncontrolled and generally haphazard manner. Users generally implement automation in any way that seems appropriate to them without awareness of organizational policies and risk.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In an embodiment, one general aspect includes a method. The method includes receiving bot presence data from a bot discovery agent executing in a computing environment. The method also includes determining, based on the bot presence data, whether an unauthorized bot is present in the computing environment. The method also includes, responsive to a determination, based on the bot presence data, that an unauthorized bot is present in the computing environment, automatically initiating a remediation workflow relative to the unauthorized bot. Other embodiments of this aspect include corresponding computer systems, apparatus, and computer programs recorded on one or more computer storage devices, each configured to perform the actions of the methods.

In an embodiment, another general aspect includes a computer system having a processor and memory. The processor and the memory in combination are operable to implement a method. The method includes receiving bot presence data from a bot discovery agent executing in a computing environment. The method also includes determining, based on the bot presence data, whether an unauthorized bot is present in the computing environment. The method also includes, responsive to a determination, based on the bot presence data, that an unauthorized bot is present in the computing environment, automatically initiating a remediation workflow relative to the unauthorized bot.

In an embodiment, in another general aspect, a computer-program product includes a non-transitory computer-usable medium having computer-readable program code embodied therein. The computer-readable program code is adapted to be executed to implement a method. The method includes receiving bot presence data from a bot discovery agent executing in a computing environment. The method also includes determining, based on the bot presence data, whether an unauthorized bot is present in the computing environment. The method also includes, responsive to a determination, based on the bot presence data, that an unauthorized bot is present in the computing environment, automatically initiating a remediation workflow relative to the unauthorized bot.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
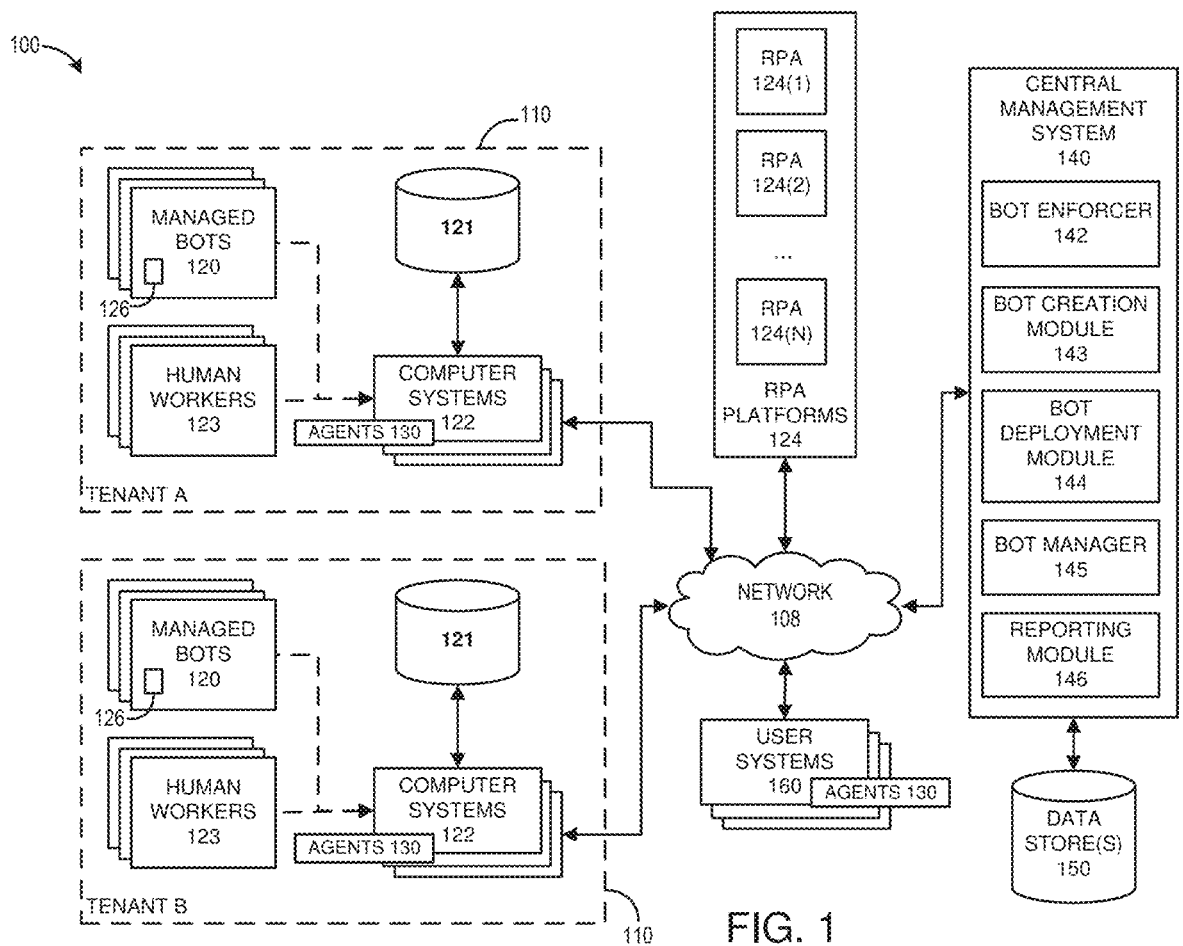
FIG. 1 illustrates an example of a system for implementing a central management system.

Robotic process automation (RPA) is the use of software, typically in combination with artificial intelligence (AI) and machine learning capabilities, to handle high-volume sequences of repeatable tasks that previously required humans to perform. These tasks can include interacting with a user interface (UI), for example, to perform, queries, calculations, maintenance of records and transactions, web automations, remote operations, database functions, terminal connections, desktop operations, text operations, mouse simulations, keyboard simulations, folder operations, file handlers, clipboard handlers, combinations of the foregoing and/or the like. RPA technology can mimic a human worker, for example, by logging into applications, entering data, calculating and completing tasks, and logging out.

RPA technology is not always part of an organization's information technology (IT) infrastructure, but can instead, sit on top of it, enabling an organization to implement RPA technology quickly and efficiently, without changing the existing infrastructure and systems. In various embodiments, a computing environment can include, for example, many hundreds or thousands of software agents or macros, often referred to herein as "bots," that automatically perform robotic processes. In various cases, the sequence of computer-implemented tasks performed by each bot can be the same or different, or a combination thereof. Oftentimes, the computing environment can further include, for example, many hundreds or thousands of human workers that likewise execute the same or similar computer-implemented tasks, or a combination thereof, via manual interaction with UIs. A set or sequence of computer-implemented tasks, such as the foregoing example tasks, may be referred to as a user-executed process.

Although bots, potentially in combination with human workers, can provide greater efficiency via increased automation, bots introduce numerous technical problems. For example, in many organizations, bot deployments, such as RPA, macros and other forms of automations, are implemented as projects, proof of concepts (POCs) and centers of excellence (COEs) by operations groups, and not in a centralized manner. Many bots function as desktop level RPAs working on users' equipment without server hosting while other bots are hosted by third-party vendors. Employees are authorized to use enterprise assets for their business operations, which involve critical data exchange between various business functions. Business operations and the asset usage are regulated and governed by enterprise compliance & information security groups. Problematically, various departments and groups in an organization procure hardware and install it in their servers, with or without chief information officer (CIO) or other appropriate approval. At times, organizations acquire hardware and digital assets without documentation, which results in non-compliant and insecure use of hardware and digital assets.

The present disclosure describes examples of automatically discovering previously unknown bots in an organization and implementing enterprise control of such bots. In various embodiments, discovery agents can be deployed across some or all computing environments in an organization. Thereafter, the bot discovery agents can be leveraged to discover bots and automatically determine, in a centralized manner, whether the bots are authorized or unauthorized. In various embodiments, remediation workflows can be automatically initiated relative to unauthorized bots. Further, in various embodiments, authorized bots and/or unauthorized bots can be automatically subjected to centralized enterprise control. Examples will be described below relative to the Figures.

For purposes of this application, the term "UI" can include, without limitation, any type of human-machine interface. Example UIs include text-based interfaces such as command-line interfaces, conversational interfaces, crossing-based interfaces, direct manipulation interfaces, gesture interfaces, graphical UIs (GUIs), hardware interfaces, holographic UIs, intelligent UIs, motion tracking interfaces, natural-language interfaces, object-oriented UIs, reflexive UIs, touchscreen interfaces, touch UIs, voice UIs, and web-based UIs. Many of the aforementioned UIs accept input via input devices such as a keyboard, mouse, microphone, combinations of the foregoing, and/or the like. Inputs from any of these devices, in possible combination with specific UI objects or components, can be considered examples of UI events. A user, unless specifically stated otherwise, or otherwise understood within the context as used, can include any entity, including a human or bot, that can interact with a UI.

FIG. 1 illustrates an example of a system 100 for implementing a central management system 140 for bot discovery and enforcement. The system 100 includes the central management system 140, tenant systems 110, RPA platforms 124, user systems 160 and one or more data stores 150, each of which is operable to communicate over a network 108. The network 108 may be, or include, one or more of a private network, a public network, a local or wide area network, a portion of the Internet, combinations of the same, and/or the like.

In some aspects, the central management system 140 can centrally manage bot deployments on the RPA platforms 124 for its tenants. The RPA platforms 124 are shown to include an RPA platform 124(1), an RPA platform 124(2) and an RPA platform 124(N). It should be appreciated that three RPA platforms are shown among the RPA platforms 124 only for illustrative purposes. In various implementations, any number of RPA platforms can be included among the RPA platforms 124. In a typical embodiment, the RPA platforms 124 each provide RPA software for creating and executing bots, generally using different RPA technology, interfaces and formats.

In particular, in the system 100, the tenant systems 110 can be served by the central management system 140. In general, the tenant systems 110 can each be considered an abstraction of users, inclusive of both bots and human workers, that execute user-executed processes managed by the central management system 140, and the systems and data sources with which those users interact. For example, one of the tenant systems 110 is shown as being owned or operated by "Tenant A" while another system 110 is shown as being owned or operated by a different tenant, "Tenant B." The tenant systems 110 shown can be owned or operated by the same or different entities. For example, Tenants A and B can represent customers (e.g., entities such as companies or individuals) of an operator of the central management system 140. Although the term "tenant" is used herein to describe the tenant systems 110 or owners/operators thereof, in addition to having its ordinary meaning, the term "tenant" can, but need not, refer to tenancy in a multitenant software architecture.

The tenant systems 110 are each shown to include one or more managed bots 120, one or more managed human workers 123, one or more computer systems 122 and one or more data sources 121. The one or more computer systems 122 can each provide a computing environment, inclusive of applications and corresponding UIs and dashboards, for executing configurable tasks. As illustrated, any given one of the computer systems 122 may be operated by one of the managed bots 120 or one of the human workers 123. In some cases, the computer systems 122 may represent desktop virtualization environments. In such cases, the human workers 123, for example, may operate the user systems 160 and access the desktop virtualization environments over the network 108.

The one or more data sources 121 of each of the tenant systems 110 can include data streams or datasets that can be received or processed by the computer systems 122, potentially as part of executing the configurable tasks. In various cases, the one or more data sources 121 can be updated by the computer systems 122, or other components, in real-time, on a periodic basis, e.g., according to a schedule, on-demand or a combination of the same. In various cases, the tasks for which the computer systems 122 are configured can be executed in the respective computing environments, for example, manually by the human workers 123 and/or robotically by the managed bots 120. In a typical embodiment, the managed bots 120 are each deployed on an RPA platform of the RPA platforms 124 and interact as users in the computing environments of the computer systems 122 for purposes executing some or all of the configurable tasks as robotic processes.

The managed bots 120 can each include an instruction set 126 that can be used to provide the managed bots 120 a complete set of all computer-implemented tasks or steps that are to be performed in sequence automatically by the managed bots 120, for example, as a user-executed process. In some embodiments, the instruction set 126 is in a machine-readable code that can be recognized and executed by a central processing unit. In various embodiments, the instruction set 126 can be made up of, for example, a markup language, a low-level programming language, a high-level programming language, a scripting language, a machine language, an assembly language or any combination thereof.

As illustrated, the computer systems 122 and/or the user systems 160 can include bot discovery agents 130. The bot discovery agents 130 are software agents that can be used to discover and detect bots that are not centrally managed by the central management system 140 and therefore are not among the managed bots 120. In certain embodiments, the bot discovery agents 130 can be individually triggered to monitor and record certain information and activity in the computing environments provided by the computer systems 122. The activity can represent, for example, activity performed by bots. The activity can include, for example, UI activity.

In the illustrated embodiment, the central management system 140 can include a bot enforcer 142, a bot manager 145, a bot deployment module 144, a reporting module 146 and a bot creation module 143. Each of these components can be implemented with hardware and/or software, including (optionally) virtual machines and containers. In an example, the central management system 140 can be implemented as a single management server. In another example, the central management system 140 can be implemented in a plurality of virtual or physical servers, which may or may not be geographically co-located. In some embodiments, the central management system 140 and/or other aspects of the system 100 may be hosted on a cloud-provider system.

In certain embodiments, features of the components of the central management system 140 can be made accessible over an interface to the user systems 160. The user systems 160 can include any type of computing device, including desktops, laptops, tablets, and smartphones, to name a few. The user systems 160 can be operated by users, such as the human workers 123, or by other users, for example, for administration purposes.

The bot enforcer 142 can, for each of the tenant systems 110, in collaboration with the bot discovery agents 130, enable automated detection and control of unauthorized bots in any computing environment subject to the central management system 140. In certain embodiments, the bot enforcer 142 can deploy the bot discovery agents 130 and trigger bot discovery by each the bot discovery agents 130, or any configurable subset thereof (e.g., by tenant, business unit, user groups, etc.). The bot discovery agents 130 can generate bot presence data, which data indicates an existence of bots in their respective computing environments. The bot discovery agents 130 can send the bot presence data to the bot enforcer 142 for processing. The bot enforcer 142, in turn, can determine, based on the bot presence data, whether unauthorized bots are executing in the respective computing environments. In various embodiments, a remediation workflow can be automatically initiated when unauthorized bots are detected. Example implementations of the bot enforcer 142 and/or the bot discovery agents 130 will be described in greater detail relative to FIG. 2.

The bot creation module 143 can be utilized to create bots such as, for example, the managed bots 120. In some embodiments, an instruction set is created via the bot creation module 143 that contains all of the instructions and/or modules for a specific type of bot. The instruction set that is created can be similar to the instruction set 126 of each of the managed bots 120. In certain embodiments, the bot creation module 143 can utilize information from the bot enforcer 142 to automatically create each instruction set. In some embodiments, the bot creation module 143 includes or provides a configuration interface for automatic and/or manual creation of an instruction set, or for revision or tuning of an instruction set. The configuration interface can be accessible, for example, by the user systems 160.

In certain embodiments, the bot deployment module 144 can be utilized to deploy a bot on the RPA platforms 124 for a tenant, such that the deployed bot becomes one of the managed bots 120. In various embodiments, the bot deployment module 144 can utilize an instruction set created by the bot creation module 143 that can then be deployed. For example, the instruction set 126 of one of the managed bots 120 could be representative of a bot created by the bot creation module 143 and then deployed via the bot deployment module 144. In certain embodiments, the bot deployment module 144 can be used to deploy a single bot and/or a plurality of bots concurrently. In many cases, the bot deployment module 144 can be utilized to deploy bots on a variety of the RPA platforms 124. In some embodiments, the bot deployment module 144 can publish a configuration interface to the user systems 160, for example, for administrators, super users or other users (e.g., of a particular tenant) to select or specify such commands. In other embodiments, the bot deployment module 144 executes an automatic process to deploys bots without manual interaction. In various embodiments, the bot deployment module 144 can store command sets for some or all of the RPA platforms 124.

The bot manager 145 can serve to manage bots such as, for example, the managed bots 120, for tenants. In certain embodiments, the bot manager 145 can issue commands to control operation of bots. The bot manager 145 can be utilized to re-configure, optimize and/or customize any of the managed bots 120. For example, various commands can start or stop bots, perform configuration management, combinations of the same and/or the like. In some cases, the bot manager 145 can publish a configuration interface to the user systems 160, for example, for administrators, super users or other users (e.g., of a particular tenant) to select or specify such commands.

The reporting module 146 can provide an interface for regular or on-demand reports related to the managed bots 120, the managed human workers 123, and/or operation of the bot enforcer 242. The reporting module 146 can publish reports or other generated information, for example, to a webpage, user dashboard, and/or the like. The reporting module 146 can generate and execute a query of the one or more data stores 150, as appropriate. The web page, user dashboard or other UI(s) output, for example, by the reporting module 146, can be accessed by certain users of the user systems 160.

In general, the one or more data stores 150 can include any information collected, stored or used by the central management system 140. For example, in various embodiments, the one or more data stores 150 can include instruction sets for bots, command sets for one or more of the RPA platforms 124, deployment settings for bots (e.g., on a tenant-specific and/or bot-specific basis), metadata for bots to be deployed, data collected from the managed bots 120, the human workers 123 or the computer systems 122, combinations of the same and/or the like. In certain embodiments, data stored in the one or more data stores 150 can take the form of repositories, flat files, databases, etc. In certain embodiments, the one or more data stores 150 can be utilized as an event library, in which actions performed by any of the managed bots 120 and/or the user systems 160 are stored. The event library can also contain business rule libraries, exception libraries, control libraries, keyboard libraries, database libraries and/or cognitive libraries.

Figure 2:
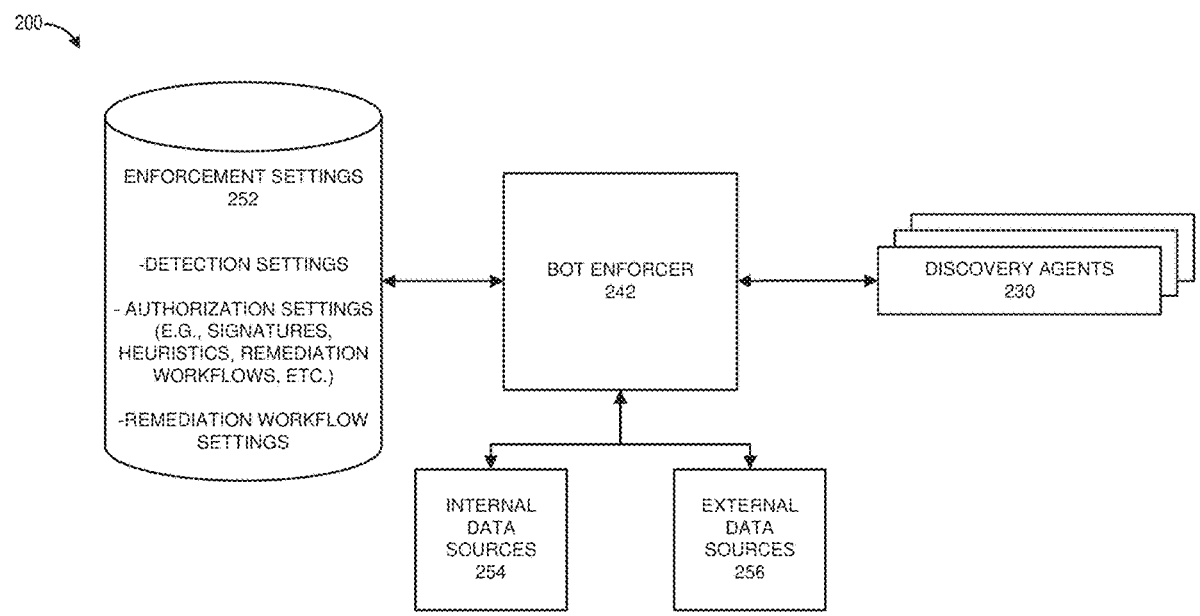
FIG. 2 illustrates an example of an environment for bot discovery and enforcement.

FIG. 2 illustrates an example of an environment 200 for a bot enforcer 242. The environment 200 includes the bot enforcer 242, bot discovery agents 230, enforcement settings 252, internal data sources 254, and external data sources 256. In various embodiments, functionality can be distributed between the bot discovery agents 130 and the bot enforcer 142 in any suitable fashion. In general, the bot discovery agents 230 and the bot enforcer 242 can each operate as described relative to the bot discovery agents 130 and the bot enforcer 142, respectively, of FIG. 1.

The enforcement settings 252 can include, for example, detection settings, authorization settings, and remediation workflow settings. The detection settings can include settings utilized by the bot discovery agents 230 to detect bots in their respective computing environments. For example, the detection settings can indicate what information, file paths, behaviors and/or the like are monitored for and detected by the bot discovery agents 230, what information is generated, for example, as bot presence data, a frequency of detection, etc. The detection settings can differ, for example, by tenant, organization, customer account, business unit, user group, combinations of the foregoing and/or the like.

The authorization settings in the enforcement settings 252 can include information or data usable to determine, based on bot presence data, whether an unauthorized bot is present or executing in a given computing environment. In certain embodiments, the authorization settings can include signatures of authorized bots, signatures of unauthorized bots, or the like. For any given bot, the signatures can specify, as applicable, applications, observed application behaviors or actions, an RPA platform on which a given bot is deployed, application runtime details, or the like. In addition, or alternatively, the authorization settings can include or define heuristics that are usable to determine, based on the bot presence data, whether an unauthorized bot is present or executing in the given computing environment.

The remediation workflow settings in the enforcement settings 252 can define or establish remediation workflows that are initiated in response to a determination that an unauthorized bot is present or executing in a given computing environment. Each remediation workflow can include one or more actions that are taken. Example actions that may be taken include blocking an unauthorized bot from executing, triggering uninstallation of the unauthorized bot, providing a recommendation to convert an unauthorized bot to an authorized bot, and identifying and flagging the authorized bot to appropriate personnel via a dashboard, notification or other suitable method (e.g., via the reporting module 146).

The bot discovery agents 230 can initiate a bot discovery process and generate bot presence data based thereon. The bot discovery process can be executed on a continuous or periodic basis in accordance with detection settings of the type described above. In various embodiments, the bot discovery process can include software tracing and recording, file extractions, process monitoring, etc. The bot presence data can include an information set for each bot or potential bot that is detected. For example, the bot presence data can include application or macro names or identifiers, application runtimes, an identification of RPA platforms on which a bot is deployed, observed application behaviors, bot instruction sets similar to the instruction set 126 of FIG. 1, application files, combinations of the foregoing and/or the like. In some cases, the bot presence data can include, for each bot or potential bot, information of a same or similar format as signatures stored in the enforcement settings 252.

The bot enforcer 242 is operable to deploy the bot discovery agents 230 in computing environments provided by any given system or device managed by the central management system 140 of FIG. 1 such as, for example, the computer systems 122 and/or the user systems 160 of FIG. 1. The bot enforcer 242 can also provide or send, to each of the bot discovery agents 230, individualized detection settings from the enforcement settings 252. Such detection settings can be provided initially upon deployment and can be updated on a continuous or ongoing basis.

In various embodiments, the bot enforcer 242 can trigger, or cause, bot discovery by the bot discovery agents 230 in accordance with their individual detection settings. In various embodiments, the bot enforcer 242 can trigger or cause bot discovery in numerous fashions. In an example, the bot enforcer 242 can trigger or cause bot discovery by sending a command to execute the bot discovery immediately upon receipt of the command. In another example, the bot enforcer 242 can send a command to schedule the bot discovery. In another example, the bot enforcer can trigger or cause bot discovery by virtue of the bot discovery agents 230 having been deployed, such that each of some of the bot discovery agents 230 continuously or periodically execute bot discovery in accordance with their individual detection settings.

Upon receipt of bot presence data from any of the bot discovery agents 230, the bot enforcer 242 can determine, according to the authorization settings in the enforcement settings 252, whether an unauthorized bot is present in a computing environment. In various embodiments, the determination of whether an unauthorized bot is present can include applying heuristics and/or mapping the bot presence data to signatures in the enforcement settings 252. Examples will be described below.

For example, with respect to heuristics, the bot enforcer 242 can, for each bot or potential bot, apply behavior classification and/or general classification of bot presence data. The heuristics can involve, for example, matching the bot presence data for a given bot to an identified authorized bot, to an identified unauthorized bot, or otherwise yielding an authorized or unauthorized determination. In some embodiments, classification can be performed via a supervised machine learning algorithm that predicts authorization or non-authorization based on the bot presence data. In addition, or alternatively, various embodiments can utilize at least one of the classification types such as binary classification, multi-class classification and multi-label classification. In addition, or alternatively, various embodiments can use imbalanced classification, which classification includes techniques such as classification logistic regression, stochastic gradient descent, k-nearest neighbors, decision trees, random forest, artificial neural network, support vector machine and naive bayes.

For example, with respect to signature mapping, the determination of whether an unauthorized bot is present can include mapping the bot presence data to signatures in the enforcement settings 252. In some cases, the signatures in the enforcement settings 252, if any, can be indicative of unauthorized bots. In these cases, a determination that the bot presence data for a given bot matches a signature of an unauthorized bot would be indicative that the given bot is unauthorized. In addition, or alternatively, some or all signatures in the enforcement settings 252, if any, can be indicative of authorized bots. In these cases, a determination that the bot presence data for a given bot matches a signature of an authorized bot would be indicative that the given bot is authorized.

In some embodiments, for any given authorized bot, the bot enforcer 242 can initiate centralized management of the authorized bot such that, with reference to FIG. 1, the authorized bot may be treated and managed as one of the managed bots 120. In some embodiments, for any given unauthorized bot, the bot enforcer 242 can initiate, for example, a remediation workflow in accordance with the remediation workflow settings in the enforcement settings 252. As described previously, various remediation workflows can include, for example, blocking an unauthorized bot from executing, triggering uninstallation of the unauthorized bot, providing a recommendation to convert an unauthorized bot to an authorized bot, and identifying and flagging the authorized bot to appropriate personnel via a dashboard, notification or other suitable method (e.g., via the reporting module 146). In some cases, the initiation of the remediation workflow by the bot enforcer 242 can include automatically comparing the bot presence data of the unauthorized bot to a signature or other information that resulted in the unauthorized determination, and then automatically identifying one or more specific deficiencies that resulted in the unauthorized determination of that bot.

In an example, if the unauthorized bot is deemed unauthorized because it is deployed using a nonapproved RPA platform, a recommendation or correction may be to deploy the bot on a different platform (e.g., using one or more approved RPA platforms). In some embodiments involving this scenario, with reference to FIG. 1, the remediation workflow can involve the bot enforcer 242 integrating with the bot creation module 143, the bot deployment module 144 and the bot manager 145, as applicable, to stop the unauthorized bot and redeploy and start it on a specified approved RPA platform of the RPA platforms 124.

In another example, if the unauthorized bot is deemed unauthorized because it includes an unauthorized instruction in an instruction set similar to the instruction set 126 of FIG. 1, a recommendation or correction may be to remove the instruction and/or include an alternative instruction. In some embodiments involving this scenario, with reference to FIG. 1, the remediation workflow can involve the bot enforcer 242 integrating with the bot creation module 143, the bot deployment module 144 and the bot manager 145, as applicable, to stop the unauthorized bot, modify the instruction set, and redeploy and start the bot with its modified instruction set.

In various embodiments, the bot enforcer 242 can incrementally or continuously receive new settings for any of the enforcement settings 252. For example, in some embodiments, new settings can be received from the internal data sources 254. The internal data sources 254 can include, for example, internal sources or collections of signatures of the type described above In another example, in some embodiments, new settings can be received form the external data sources 256. The external data sources 256 can include, for example, settings such as signatures provided by RPA platforms of the RPA platforms 124 of FIG. 1, Internet sources and/or the like.

In various embodiments, the bot enforcer 242 can incrementally or continuously learn new settings for the enforcement settings 252. In various embodiments, the bot enforcer 242 can initially create one or more machine-learning models for authorized and/or unauthorized bots based on an initial dataset, where each machine-learning model can correspond to a specific robotic process, a step or task of a robotic process, a particular tenant, etc. In some cases, the bot enforcer 242 can create a machine-leaning model that is generic, for example, for robotic processes, steps or tasks, and/or tenant. Thereafter, the bot enforcer 242 can facilitate incremental learning based on new information. Models created and updated by the bot enforcer 242 can be included in the enforcement settings 252 or other memory.

Figure 3:
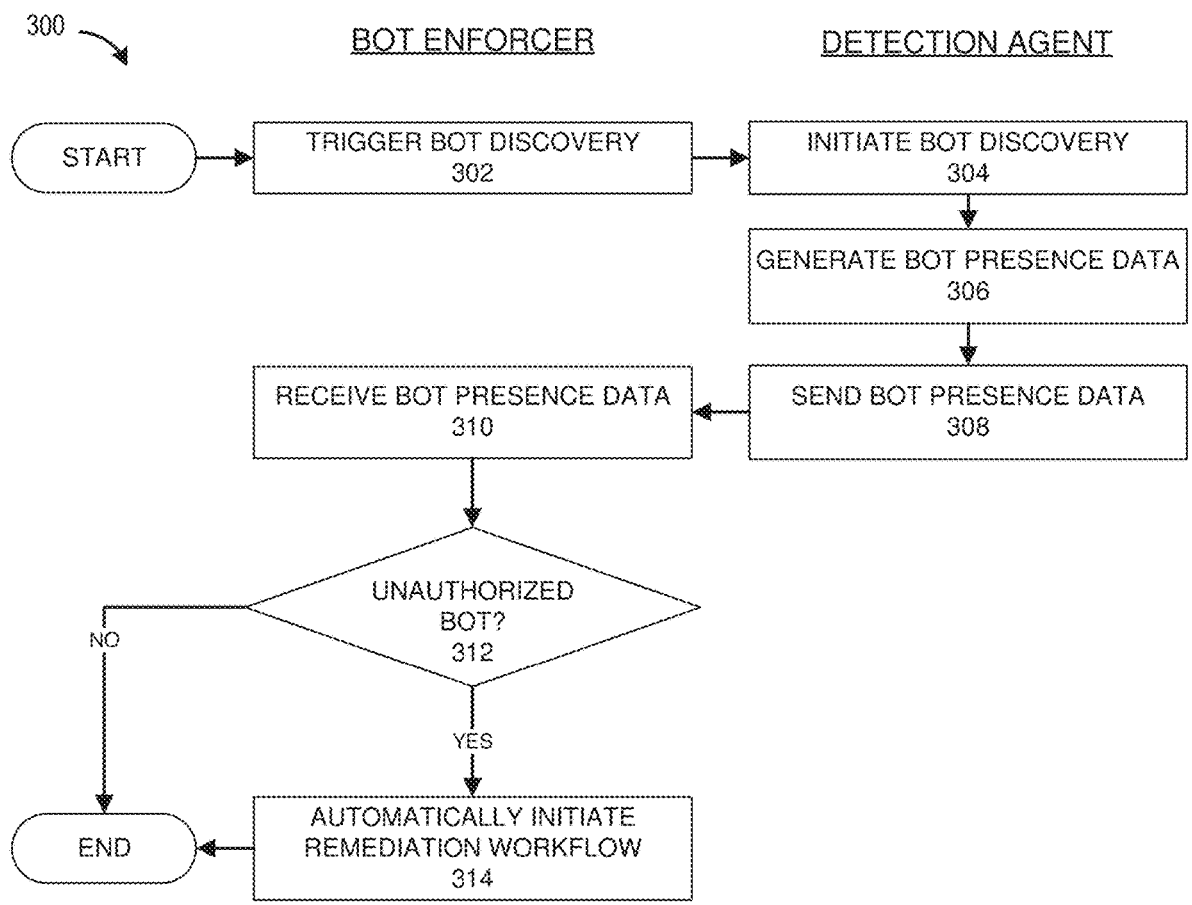
FIG. 3 illustrates an example of a process for discovering and implementing enterprise control of bots.

FIG. 3 illustrates an example of a process 300 for discovering and implementing enterprise control of bots. In certain embodiments, the process 300 can be implemented by any system that can process data. Although any number of systems, in whole or in part, can implement the process 300, to simplify discussion, the process 300 will be described in relation to particular components shown and described relative to FIGS. 1-2.

At block 302, the bot enforcer 242 triggers bot discovery for one or more discovery agents of the bot discovery agents 230. In certain embodiments, the bot enforcer 242 can trigger bot discovery in any of the ways described above relative to FIG. 2. In various embodiments, the bot enforcer 242 can trigger bot discovery by a single bot discovery agent of the bot discovery agents or by any suitable aggregate of the same. For simplicity of description, the process 300 will be described relative a single triggered discovery agent of the bot discovery agents 230.

At block 304, the triggered discovery agent initiates a bot discovery process in its computing environment as described relative to FIG. 2. At block 306, the triggered discovery agent generates bot presence data as described relative to FIG. 2. At block 308, the triggered discovery agent sends the bot presence data to the bot enforcer 242. At block 310, the bot enforcer 242 receives the bot presence data.

At decision block 312, the bot enforcer 242 determines, based on the bot presence data, whether an unauthorized bot is present or executing in the computing environment. In various embodiments, the determination at the decision block 312 can involve any of the methodologies described relative to FIG. 2. If it is determined at the decision block 312 that no unauthorized bot has been detected, the process 300 ends. Otherwise, if it is determined at the decision block 312 that an unauthorized bot is present or executing in the computing environment, the process 300 can proceed to block 314. At block 314, the bot enforcer 242 automatically initiates a remediation workflow as described relative to FIG. 2. After block 314, the process 300 ends.

Figure 4:
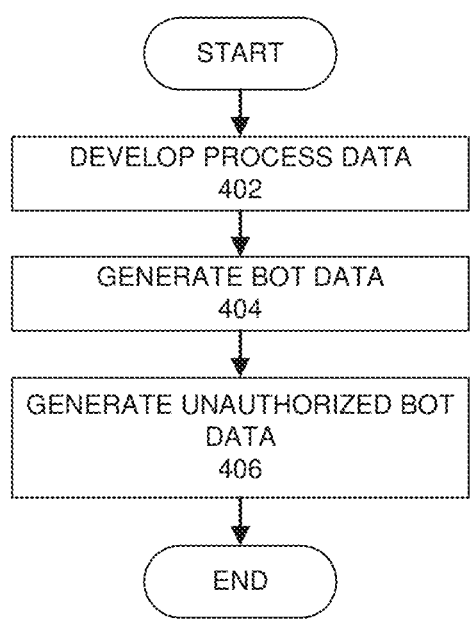
FIG. 4 illustrates an example of a process for determining whether unauthorized bots are present or executing in a computing environment.

FIG. 4 illustrates an example of a process 400 for determining whether unauthorized bots are present or executing in a computing environment. The process 400 is a logical view of example functionality that may be performed relative to the computing environment, for example, as all or part of blocks 306-312 of the process 300 of FIG. 3. In certain embodiments, the process 400 can be implemented by any system that can process data. Although any number of systems, in whole or in part, can implement the process 400, to simplify discussion, the process 300 will be described in relation to particular components shown and described relative to FIGS. 1-2.

At block 402, a triggered discovery agent, from the bot discovery agents 230, and/or the bot enforcer 242, perform a first process iteration that includes developing process data. The process data can include, for example, a list of processes executing in the computing environment. For example, in some embodiments, the process data can include information like the information listed below in Table 1.

TABLE 1

| PROCESS NAME |
| --- |
| TaniumClient |
| iisexpress |
| chromedriver |
| WmiPrvSE |
| conhost |
| chrome |
| LogonUI |
| svchost |
| mstsc |
| dllhost |

At block 404, the triggered discovery agent and/or the bot enforcer 242 perform a second process iteration that includes generating bot data using the process data. The block 404 can involve determining which processes in the process data from the block 402 represent bots or potential bots. In some embodiments, the triggered discovery agent can include rules or other logic that map individual processes (e.g., by name or other identifier) to particular bots or potential bots. In this way, the bot data can include, for example, a list of bots or potential bots that are executing in the computing environment. For example, the bot data can include information like the information listed below in Table 2. In certain embodiments, blocks 402 and 404 can be performed as all or part of the block 306 of FIG. 3, such that the generated bot data represents all or part of the bot presence data discussed previously.

TABLE 2

| BOT ID | BOT NAME |
| --- | --- |
| 68878 | AFTE_ICS_DemoBot |
| 68879 | AFTE_ADAM_DemoBot |
| 68882 | AFTE_ICS_Sample2 |
| 68883 | AFTE_ICS_New_user_Ad_date_test |
| 68884 | AFTE_ICS_Ad_Access_Setup_UniverseAccess1 |

At block 406, the triggered discovery agent and/or the bot enforcer 242 execute a third process iteration that includes generating unauthorized bot data for the computing environment. The block 406 can involve determining which bots or potential bots in the bot data from the block 404 represent unauthorized bots that are present or executing in the computing environment. In general, this determination can include any of the functionality described relative to FIGS. 2 and 3. For example, the unauthorized bot data can include information like the information listed below in Table 3. After block 406, the process 400 ends.

TABLE 3

| MAIN WINDOW TITLE | PROCESS NAME | MAIN WINDOW HANDLE | PRIVATE MEMORY SIZE 64 | PROCESS |
| --- | --- | --- | --- | --- |
| ResumeWindow | AFTE_ADAM_DemoBot | 1837746 | 34050048 | System.Diagnostics.Process (AFTE) |

Figure 5:
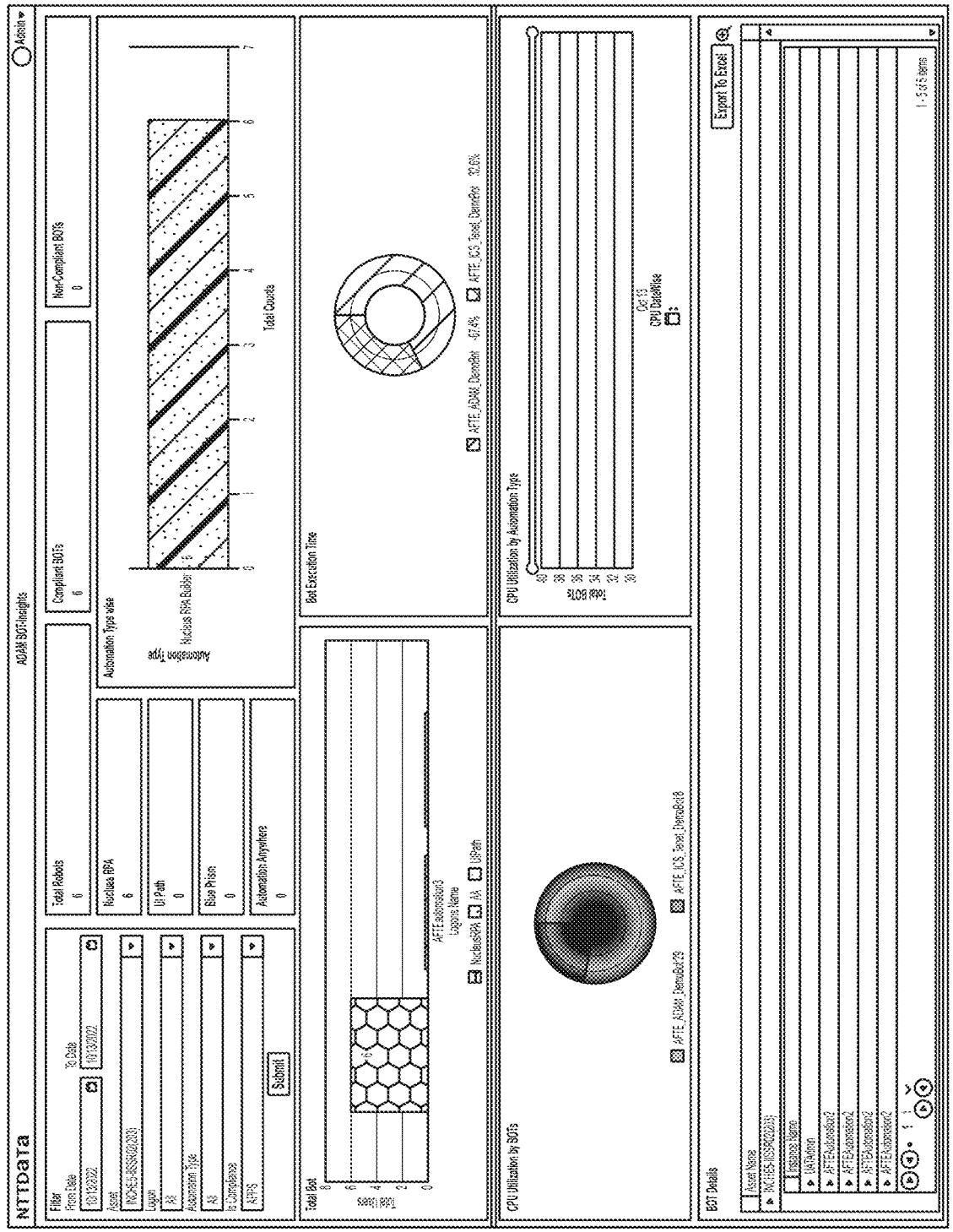
FIG. 5 illustrates an example dashboard.

FIG. 5 illustrates an example dashboard 500. The dashboard 500 can be produced, for example, by the reporting module 146 of FIG. 1. The dashboard 500 illustrates an example of bot data, such as unauthorized bot data, that can be aggregated across multiple computing environments and presented to an administrator or other user. For example, with reference to FIG. 1, in various embodiments, a dashboard like the dashboard 500 can aggregate data, such as unauthorized bot data, for all of the computer systems 122, or any configurable subset thereof. For example, the data, such as unauthorized bot data, can be aggregated and presented by tenant, organization, business unit, user group, customer account, combinations of the foregoing and/or the like. Dashboards such as the dashboard 500 can be generated in real-time, on demand, and/or at any desired interval.

Figure 6:
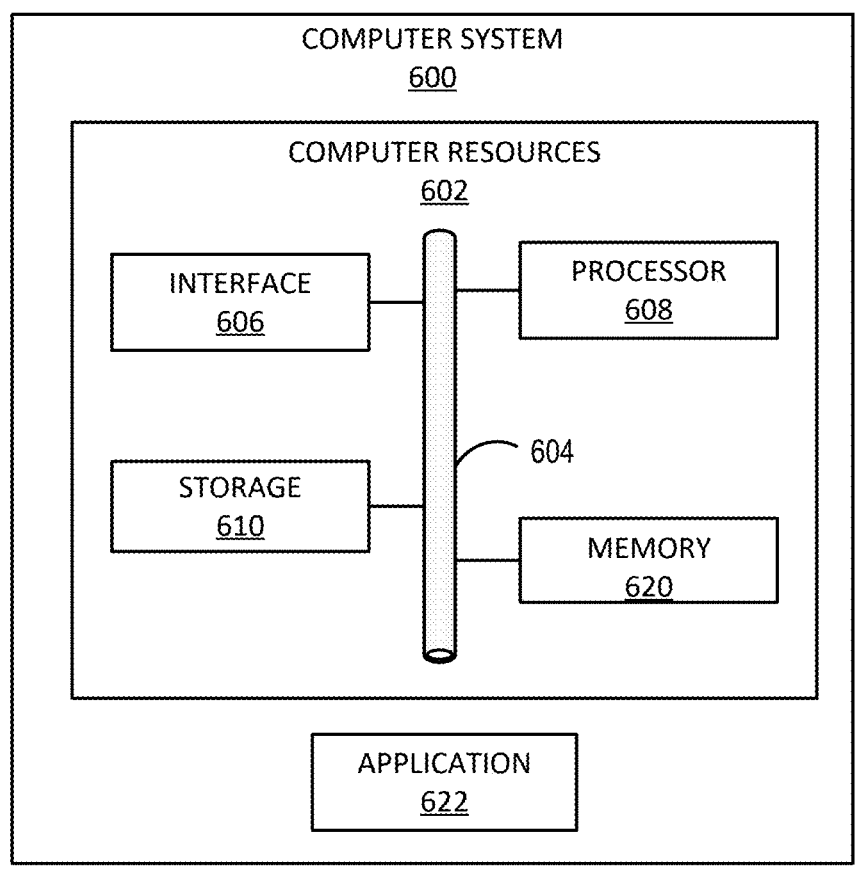
FIG. 6 illustrates an example of a computer system.

FIG. 6 illustrates an example of a computer system 600 that, in some cases, can be representative, for example, of the central management system 140, the RPA platforms 124, the tenant systems 110, the user systems 160 and/or a module or sub-component of the foregoing. The computer system 600 includes an application 622 operable to execute on computer resources 602. The application 622 can be, for example, any of the systems or modules illustrated in FIG. 1 or FIG. 2. In particular embodiments, the computer system 600 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the computer system 600 may comprise any suitable physical form, configuration, number, type and/or layout. As an example, and not by way of limitation, the computer system 600 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 600 may include one or more computer systems; be unitary or distributed; span multiple locations; span multiple machines; or reside in a cloud, which may include one or more cloud components in one or more networks.

In the depicted embodiment, the computer system 600 includes a processor 608, memory 620, storage 610, interface 606, and bus 604. Although a particular computer system is depicted having a particular number of particular components in a particular arrangement, this disclosure contemplates any suitable computer system having any suitable number of any suitable components in any suitable arrangement.

Processor 608 may be a microprocessor, controller, or any other suitable computing device, resource, or combination of hardware, software and/or encoded logic operable to execute, either alone or in conjunction with other components, (e.g., memory 620), the application 622. Such functionality may include providing various features discussed herein. In particular embodiments, processor 608 may include hardware for executing instructions, such as those making up the application 622. As an example, and not by way of limitation, to execute instructions, processor 608 may retrieve (or fetch) instructions from an internal register, an internal cache, memory 620, or storage 610; decode and execute them; and then write one or more results to an internal register, an internal cache, memory 620, or storage 610.

In particular embodiments, processor 608 may include one or more internal caches for data, instructions, or addresses. This disclosure contemplates processor 608 including any suitable number of any suitable internal caches, where appropriate. As an example, and not by way of limitation, processor 608 may include one or more instruction caches, one or more data caches, and one or more translation lookaside buffers (TLBs). Instructions in the instruction caches may be copies of instructions in memory 620 or storage 610 and the instruction caches may speed up retrieval of those instructions by processor 608. Data in the data caches may be copies of data in memory 620 or storage 610 for instructions executing at processor 608 to operate on; the results of previous instructions executed at processor 608 for access by subsequent instructions executing at processor 608, or for writing to memory 620, or storage 610; or other suitable data. The data caches may speed up read or write operations by processor 608. The TLBs may speed up virtual-address translations for processor 608. In particular embodiments, processor 608 may include one or more internal registers for data, instructions, or addresses. Depending on the embodiment, processor 608 may include any suitable number of any suitable internal registers, where appropriate. Where appropriate, processor 608 may include one or more arithmetic logic units (ALUs); be a multi-core processor, include one or more processors 608; or any other suitable processor.

Memory 620 may be any form of volatile or non-volatile memory including, without limitation, magnetic media, optical media, random access memory (RAM), read-only memory (ROM), flash memory, removable media, or any other suitable local or remote memory component or components. In particular embodiments, memory 620 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 620 may include one or more memories 620, where appropriate. Memory 620 may store any suitable data or information utilized by the computer system 600, including software embedded in a computer readable medium, and/or encoded logic incorporated in hardware or otherwise stored (e.g., firmware). In particular embodiments, memory 620 may include main memory for storing instructions for processor 608 to execute or data for processor 608 to operate on. In particular embodiments, one or more memory management units (MMUs) may reside between processor 608 and memory 620 and facilitate accesses to memory 620 requested by processor 608.

As an example, and not by way of limitation, the computer system 600 may load instructions from storage 610 or another source (such as, for example, another computer system) to memory 620. Processor 608 may then load the instructions from memory 620 to an internal register or internal cache. To execute the instructions, processor 608 may retrieve the instructions from the internal register or internal cache and decode them. During or after execution of the instructions, processor 608 may write one or more results (which may be intermediate or final results) to the internal register or internal cache. Processor 608 may then write one or more of those results to memory 620. In particular embodiments, processor 608 may execute only instructions in one or more internal registers or internal caches or in memory 620 (as opposed to storage 610 or elsewhere) and may operate only on data in one or more internal registers or internal caches or in memory 620 (as opposed to storage 610 or elsewhere).

In particular embodiments, storage 610 may include mass storage for data or instructions. As an example, and not by way of limitation, storage 610 may include a hard disk drive (HDD), a floppy disk drive, flash memory, an optical disc, a magneto-optical disc, magnetic tape, or a Universal Serial Bus (USB) drive or a combination of two or more of these. Storage 610 may include removable or non-removable (or fixed) media, where appropriate. Storage 610 may be internal or external to the computer system 600, where appropriate. In particular embodiments, storage 610 may be non-volatile, solid-state memory. In particular embodiments, storage 610 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these Storage 610 may take any suitable physical form and may comprise any suitable number or type of storage. Storage 610 may include one or more storage control units facilitating communication between processor 608 and storage 610, where appropriate.

In particular embodiments, interface 606 may include hardware, encoded software, or both providing one or more interfaces for communication (such as, for example, packet-based communication) among any networks, any network devices, and/or any other computer systems. As an example, and not by way of limitation, communication interface 606 may include a network interface controller (NIC) or network adapter for communicating with an Ethernet or other wire-based network and/or a wireless NIC (WNIC) or wireless adapter for communicating with a wireless network.

Depending on the embodiment, interface 606 may be any type of interface suitable for any type of network for which computer system 600 is used. As an example, and not by way of limitation, computer system 600 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 600 may include any suitable interface 606 for any one or more of these networks, where appropriate.

In some embodiments, interface 606 may include one or more interfaces for one or more I/O devices. One or more of these I/O devices may enable communication between a person and the computer system 600. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 606 for them. Where appropriate, interface 606 may include one or more drivers enabling processor 608 to drive one or more of these I/O devices. Interface 606 may include one or more interfaces 606, where appropriate.

Bus 604 may include any combination of hardware, software embedded in a computer readable medium, and/or encoded logic incorporated in hardware or otherwise stored (e.g., firmware) to couple components of the computer system 600 to each other. As an example, and not by way of limitation, bus 604 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 604 may include any number, type, and/or configuration of buses 604, where appropriate. In particular embodiments, one or more buses 604 (which may each include an address bus and a data bus) may couple processor 608 to memory 620. Bus 604 may include one or more memory buses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 608 (such as, for example, one or more internal registers or caches), one or more portions of memory 620, one or more portions of storage 610, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments, are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of automatic discovery and control of robotic process automation (RPA) bots, the method comprising, by a computer system:
   developing, via an RPA bot discovery agent executing in a computing environment, process data comprising a list of processes executing in the computing environment;
   identifying, via the RPA bot discovery agent, at least one RPA bot executing in the computing environment by determining that one or more processes in the list of processes represent the at least one RPA bot;

responsive to the identifying, generating, via the RPA bot discovery agent, RPA bot presence data for the computing environment, the generated RPA bot presence data identifying the at least one RPA bot and an RPA platform of the at least one RPA bot;

determining, using the RPA bot presence data, that the at least one RPA bot is unauthorized;

responsive to the determining that the at least one RPA bot is unauthorized, automatically identifying one or more deficiencies in the at least one RPA bot that resulted in the determination that the at least one RPA bot is unauthorized; and automatically correcting the one or more deficiencies in the at least one RPA bot.

2. The method of claim 1, comprising triggering RPA bot discovery by a plurality of RPA bot discovery agents executing in a plurality of computing environments, wherein the RPA bot presence data is received responsive to the triggering.

3. The method of claim 2, wherein the triggering comprises sending, to each of the plurality of RPA bot discovery agents, a command to execute the RPA bot discovery upon receipt of the command.

4. The method of claim 2, wherein the triggering comprises sending, to each of the plurality of RPA bot discovery agents, a command to schedule the RPA bot discovery.

5. The method of claim 1, wherein the determining that the at least one RPA bot is unauthorized comprises mapping the RPA bot presence data to a plurality of signatures.

6. The method of claim 5, wherein:
the plurality of signatures comprise one or more signatures of authorized RPA bots; and
the determination that the at least one RPA bot is unauthorized is based on a determination that the RPA bot presence data does not match any of the one or more signatures of authorized RPA bots.

7. The method of claim 5, wherein:
the plurality of signatures comprise one or more signatures of unauthorized RPA bots; and
the determination that the at least one RPA bot is unauthorized is based on a determination that the RPA bot presence data matches at least one of the one or more signatures of unauthorized RPA bots.

8. The method of claim 1, wherein the determining that the at least one RPA bot is unauthorized comprises executing a heuristics analysis using the RPA bot presence data, the heuristics analysis comprising matching the RPA bot presence data to an identified unauthorized RPA bot.

9. The method of claim 1, wherein the RPA bot presence data indicates an instruction set of at least one bot.

10. The method of claim 1, wherein the RPA bot presence data indicates an observed behavior of at least one RPA bot.

11. The method of claim 1, comprising:
deploying a plurality of RPA bot discovery agents in a plurality of computing environments;
triggering bot discovery by the plurality of RPA bot discovery agents in the plurality of computing environments;
receiving RPA bot presence data from each of the plurality of RPA bot discovery agents;
determining, based on the RPA bot presence data received from each of the plurality of bot discovery agents, whether an unauthorized RPA bot is present in any of the plurality of computing environments; and responsive to a determination, based on the RPA bot presence data received from each of the plurality of RPA bot discovery agents, that at least one unauthorized bot is present in the plurality of computing environments, automatically initiating a remediation workflow relative to the at least one unauthorized bot.

12. The method of claim 1, wherein;
the determining that the at least one RPA bot is unauthorized is based on the RPA platform being a non-approved RPA platform;
the identifying the one or more deficiencies comprises identifying that the at least one RPA bot is deployed using the non-approved RPA platform; and
the automatically correcting comprises automatically stopping the at least one RPA bot and redeploying the at least one RPA bot using an approved RPA platform.

13. The method of claim 1, wherein the identifying of the at least one RPA bot is based on a mapping of process names in the list of processes to particular RPA bots.

14. The method of claim 1, wherein the RPA bot discovery agent continuously executes a bot discovery process in the computing environment.

15. The method of claim 1, wherein;
the RPA bot presence data comprising an instruction set of the at least one RPA bot;
the determining that the at least one RPA bot is unauthorized is based on the instruction set including an unauthorized instruction;
the identifying the one or more deficiencies comprises identifying the unauthorized instruction; and
the automatically correcting comprises:
stopping the at least one RPA bot:
modifying the instruction set to correct the unauthorized instruction; and
starting the at least one RPA bot with the modified instruction set.

16. The method of claim 15, wherein the modifying comprises removing the unauthorized instruction from the instruction set.

17. The method of claim 1, comprises incrementally learning new settings for the determining, based on the RPA bot presence data, that the at least one RPA bot is unauthorized.

18. The method of claim 1, comprising receiving new settings for the determining, based on the RPA bot presence data, that the at least one RPA bot is unauthorized.

19. A computer system comprising a processor and memory, wherein the processor and the memory in combination are operable to implement a method of automatic discovery and control of robotic process automation (RPA) bots, the method comprising:
developing, via an RPA bot discovery agent executing in a computing environment, process data comprising a list of processes executing in the computing environment;
identifying, via the RPA bot discovery agent, at least one RPA bot executing in the computing environment by determining that one or more processes in the list of processes represent the at least one RPA bot;
responsive to the identifying, generating, via the RPA bot discovery agent, RPA bot presence data for the computing environment, the generated RPA bot presence data identifying the at least one RPA bot and an RPA platform of the at least one RPA bot;
determining, using the RPA bot presence data, that the at least one RPA bot is unauthorized;

responsive to the determining that the at least one RPA bot is unauthorized, automatically identifying one or more deficiencies in the at least one RPA bot that resulted in the determination that the at least one RPA bot is unauthorized; and automatically correcting the one or more deficiencies in the at least one RPA bot.

20. A computer-program product comprising a non-transitory computer-usable medium having computer-readable program code embodied therein, the computer-readable program code adapted to be executed to implement a method of automatic discovery and control of robotic process automation (RPA) bots, the method comprising:

developing, via an RPA bot discovery agent executing in a computing environment, process data comprising a list of processes executing in the computing environment;

identifying, via the RPA bot discovery agent, at least one RPA bot executing in the computing environment by determining that one or more processes in the list of processes represent the at least one RPA bot;

responsive to the identifying, generating, via the RPA bot discovery agent, RPA bot presence data for the computing environment, the generated RPA bot presence data identifying the at least one RPA bot and an RPA platform of the at least one RPA bot;

determining, using the RPA bot presence data, that the at least one RPA bot is unauthorized;

responsive to the determining that the at least one RPA bot is unauthorized, automatically identifying one or more deficiencies in the at least one RPA bot that resulted in the determination that the at least one RPA bot is unauthorized; and automatically correcting the one or more deficiencies in the at least one RPA bot.

* * * * *